United States Patent [19]
Gloudeman et al.

[11] Patent Number: 6,167,316
[45] Date of Patent: Dec. 26, 2000

[54] DISTRIBUTED OBJECT-ORIENTED BUILDING AUTOMATION SYSTEM WITH RELIABLE ASYNCHRONOUS COMMUNICATION

[75] Inventors: Jeffrey J. Gloudeman, Franklin; Donald A. Gottschalk, Wauwatosa; David E. Rasmussen, Dousman; Michael E. Wagner, Delafield, all of Wis.

[73] Assignee: Johnson Controls Technology Co., Plymouth, Mich.

[21] Appl. No.: 09/054,647

[22] Filed: Apr. 3, 1998

[51] Int. Cl.$^7$ ................................................. G05B 19/18
[52] U.S. Cl. .............................. 700/2; 700/79; 700/276; 709/223
[58] Field of Search .................................. 700/275, 276, 700/277, 299, 2, 79; 707/103; 709/223

[56] References Cited

U.S. PATENT DOCUMENTS

| | | | |
|---|---|---|---|
| 5,384,697 | 1/1995 | Pascucci | 700/10 |
| 5,444,851 | 8/1995 | Woest | 709/222 |
| 5,446,842 | 8/1995 | Schaeffer et al. | 709/205 |
| 5,463,735 | 10/1995 | Pascucci et al. | 709/222 |
| 5,499,365 | 3/1996 | Anderson et al. | 707/203 |
| 5,511,188 | 4/1996 | Pascucci et al. | 707/203 |
| 5,522,044 | 5/1996 | Pascucci et al. | 709/222 |
| 5,550,980 | 8/1996 | Pascucci et al. | 359/111 |
| 5,598,566 | 1/1997 | Pascucci et al. | 713/324 |
| 5,621,662 | 4/1997 | Humphries et al. | 700/276 |
| 5,758,074 | 5/1998 | Marlin et al. | 709/250 |
| 5,793,646 | 8/1998 | Hibberd et al. | 700/276 |
| 5,812,394 | 9/1998 | Lewis et al. | 700/17 |
| 5,884,072 | 3/1999 | Rasmussen | 709/223 |
| 5,909,368 | 6/1999 | Nixon et al. | 700/2 |
| 6,028,998 | 2/2000 | Gloudeman et al. | 717/1 |

OTHER PUBLICATIONS

Robert R. Seban, An Overview of Object–Oriented Design and C++, 1994, Aerospace Application Conference, Proceedings. 1994 IEEE, pp. 65–86.

Hanns–Helmuth Deubler and Meinhard Koestler, Introducing Object Orientation Into Large and Complex Systems, Nov. 1994, IEEE Transactions on Software Engineering vol. 20, No. 11, pp. 840–848.

*Primary Examiner*—William Grant
*Assistant Examiner*—Paul Rodriguez
*Attorney, Agent, or Firm*—Quarles & Brady; George E. Haas

[57] ABSTRACT

A computer-implemented building automation system is provided with an asynchronous communication architecture for supporting object-oriented applications that interact with distributed building automation devices. Standard application objects which need to be informed of changes to the value of another object's attributes use a connection object to establish an asynchronous link between standard objects. A source object has a control attribute that changes based upon the execution of this object's control method which in turn is linked to a second control attribute of a destination object. By linking these attributes, a connection object is defined to manage information being passed between these two objects. Upon instantiation of the connection object, it registers the second control attribute with the source object to receive "significant" changes in the value of its control attribute. A "significant" change is defined by a change sensitivity property associated with the control attribute, such that a message containing the value of the control attribute is transmitted to the connection object when the change in the value of the control attribute exceeds the value of the change sensitivity property. The connection object in turn writes the attribute's value from the source object to the second control attribute of the destination object. Thus, execution of the connection object happens independently from the destination object. This communication architecture also implements a reliability data structure to improve asynchronous communication when the building automation system is distributed across various building automation devices.

28 Claims, 5 Drawing Sheets

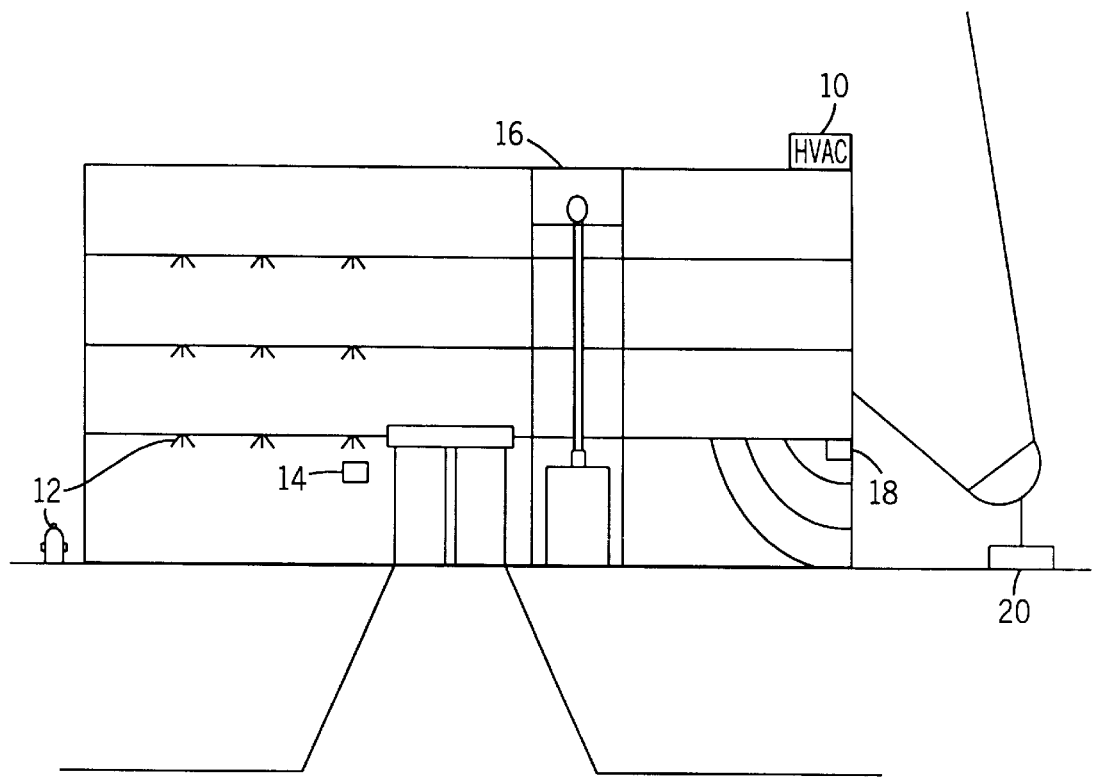
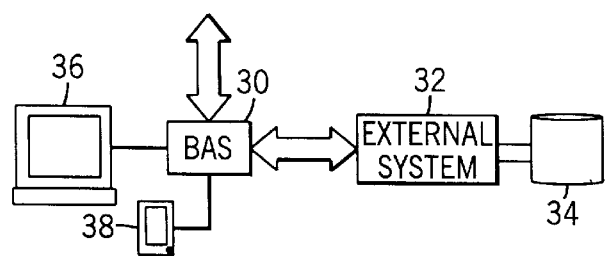
FIG. 1

DISTRIBUTED OBJECT-ORIENTED BUILDING AUTOMATION SYSTEM WITH RELIABLE ASYNCHRONOUS COMMUNICATION

BACKGROUND OF THE INVENTION

The present invention relates generally to building automation systems. More particularly, the invention relates to an object-oriented building automation system that uses distributed components with an improved and reliable asynchronous communication system.

The trend today in building automation systems is a movement of system intelligence from the central master controller to the individual building automation devices. Whereas once building automation control functions were administered from a central host computer, now many control functions are being placed in the device controllers themselves, often located on nodes of a network far from any central master controller. It is expected that the ever increasing supply of lower cost microprocessors, microcontrollers, and the continual drop in random access memory prices will drive even more control functionality from the central master controller to the system nodes.

To take full advantage of available hardware, building automation system designers would like to create distributed systems made up of intelligent components that work interchangeably with one another. Although the individual controllers at each node in a building automation network lack considerable computing power, they represent considerable computing power when considered collectively. The problem control engineers face today is how to harness that computing power. If these individual controllers could be integrated to work collectively they could perform sophisticated functions formerly possible only by using a powerful central controller. The difficulty has heretofore been how to integrate these controllers so that collectively they may perform sophisticated functions.

The present invention provides a software system architecture that allows software engineers to more readily build modular, portable building automation applications. The software system architecture is based on a distributed application component model that includes object-oriented constructs for performing a range of services used to construct more complex applications. The invention provides a development architecture in which sophisticated building automation applications may be constructed from a plurality of comparatively simple standard building automation objects. These objects, many of which are quite small and perform a singular purpose, communicate with one another asynchronously through special connection objects provided by the communication architecture of the invention. The connection objects serve as the glue that binds the other standard objects into a complex building automation application.

One additional problem system designers have had to grapple with is reliability in an distributed and asynchronous communication environment. As functionality becomes increasingly distributed onto many nodes throughout a complex network, it becomes more difficult to trap errors and handle faults in a way that minimizes the effect upon the system as a whole. While it is relatively straightforward to embed an error-handling routine into each node controller (to handle local faults), it is far more difficult in a distributed system to ensure that other node controllers take appropriate corrective action when one of the sibling nodes fails. The lack of a central controller adds to the problem, as there is often no single controller in charge of all error handling and/or reliability determinations.

SUMMARY OF THE INVENTION

To help solve the above-identified problems, the present invention is an asynchronous communication architecture for supporting applications in a computer-implemented building automation system. Standard objects which need to be informed of changes to the value of another object's attributes use a connection object to establish an asynchronous link between standard objects. A source object has a control attribute that changes based upon the execution of this object's control method which in turn is linked to a second control attribute of a destination object. By linking these attributes, a connection object is defined to manage information being passed between these two objects.

Upon instantiation of the connection object, it registers the second control attribute with the source object to receive "significant" changes in the value of its control attribute. A "significant" change is defined by a change sensitivity property associated with the control attribute, such that a message containing the value of the control attribute is transmitted to the connection object when the change in the value of the control attribute exceeds the value of the change sensitivity property. Upon receiving this message, the connection object writes the attribute's value from the source object to the second control attribute of the destination object. Therefore, execution of the connection object happens independently from the destination object which executes its control method using the asynchronously updated value of the second control attribute. This communication architecture also implements a reliability data structure to improve asynchronous communication when the building automation system is distributed across various building automation devices.

For a more complete understanding of the invention, its objects and advantages, reference may be had to the following specification and to the accompanying drawings.

BRIEF DESCRIPTION OF THE DRAWINGS

FIG. 1 is a diagrammatic view of a building environment, illustrating the building automation system of the invention in an exemplary application;

DESCRIPTION OF THE PREFERRED EMBODIMENT

Figure 2:
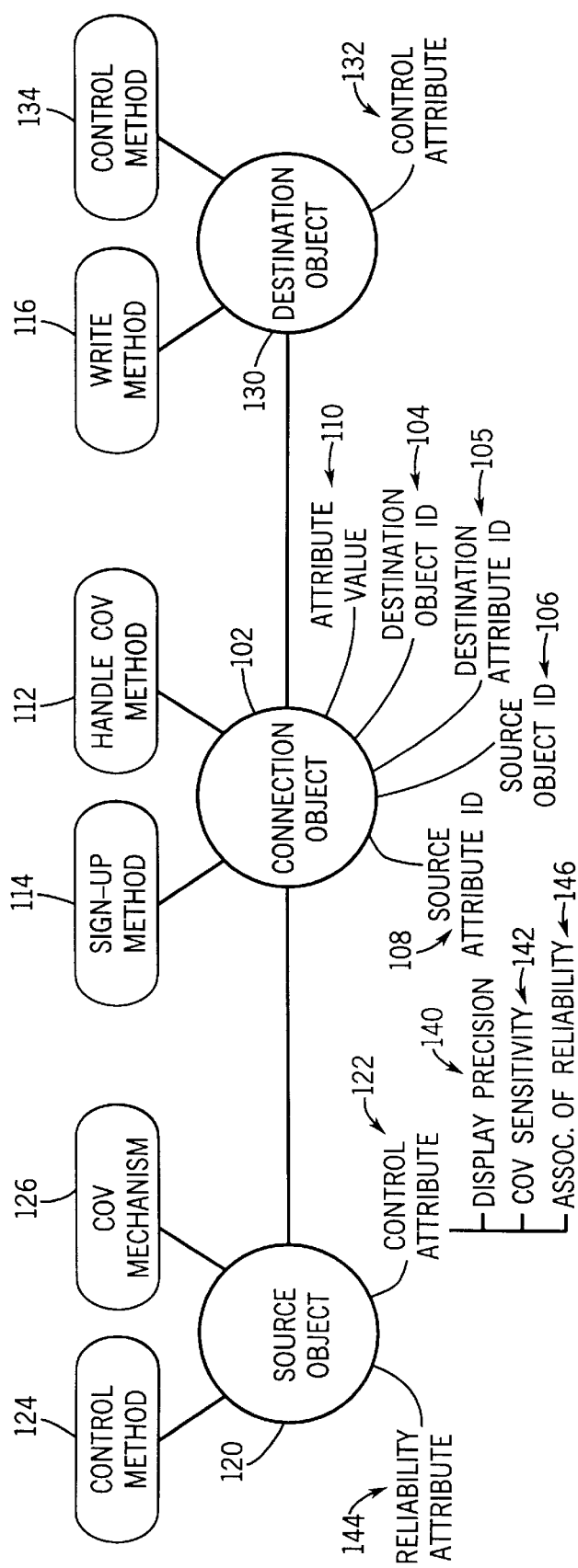
FIG. 2 is a model diagram illustrating a connection object used for asynchronous communication in the building automation system of the present invention.

The building automation system of the invention provides a computer hardware and software architecture that supports powerful object-oriented system development. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application will typically also include such other building system services as sewer and water, waste management, landscape irrigation and maintenance, parking lot and sidewalk maintenance, and physical plant inventory control.

The building automation system 30 of the invention is designed to electronically communicate with the aforementioned building systems, either by direct hardwire connection or through wireless communication; or, by accessing information stored in data files maintained by other systems within the facility. As an example of the latter, the building might have an existing heating and air-conditioning (HVAC) system that must be integrated into the system of the present invention. Such an external system, illustrated at 32, can be readily connected to the building automated system 30 through the third party interface provided by the building automated system 30. The external system 32 may include its own information storage component such as database 34. As will be more fully described below, the building automation system 30 of the invention maintains several data stores and provides the data migration capability to obtain and store information originally found in database 34 by communicating with external system 32. The building automation system 30 also provides an Information Layer interface through which the human operator can interact with the building automation system through a variety of different user interfaces. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or through some other suitable communication lengths such as a telephone connection or the Internet.

A common object superclass is stored in a computer readable memory of the building automation system 30 and defines a plurality of common objects. A standard object is a fundamental building block used by the application engineer to compose a building automation application. The definition of each standard object type includes a list of attributes defined for that object type as well as the behavior of that object. Attributes are data values which are unique for each instance of the object type. The behavior (or a method) is the logic performed by the object on its attributes. All objects support a minimum set of attributes and methods. Methods that support attribute access, object type information, snapshot views, and a general command mechanism are required for a standard object to fully function in the building automation system, for both control and user interface purposes.

Information is communicated by passing messages between standard objects. Objects are capable of processing messages directed to them from other objects, such that communication between standard objects may be synchronous or asynchronous. Each object type defines methods which are executed to process each message it supports. Amongst the minimum set of messages each object must support are a read attribute request and a write attribute request. A Read Attribute method will cause the object to respond with the current value of the attribute(s) requested, and a Write Attribute method will update the attribute(s) of the object. These methods are typically implemented for synchronous communication between objects.

However, an asynchronous approach of accessing attributes is needed to more effectively implement communication across a distributed building automation system. A Read with Signup method is used by standard objects which need to be informed of changes to the value of another object's attributes. Thus, a changed attribute message is sent to the interested object when the value of that attribute changes. By only sending messages when a change occurs, network traffic is considerably reduced between distributed devices. This asynchronous means of communicating between standard objects is referred to as Change of Value (COV) processing.

In FIG. 2, a Connection object 102 is a type of standard object that uses the Read with Signup method to implement COV processing. Connection object 102 essentially establishes the communication link between a source object 120 and a destination object 130. Each instance of Connection object 102 contains a data structure for passing attribute information from one object to another object. A destination object ID 104, destination attribute ID 105, source object ID 106, source attribute ID 108, and attribute value 110 are attributes of Connection object 102 that comprise this mapping data structure. The Connection object also supports methods to manage this passing of attribute information, including a Handle Report method 112 and a Read with Signup method 114.

Figure 3:
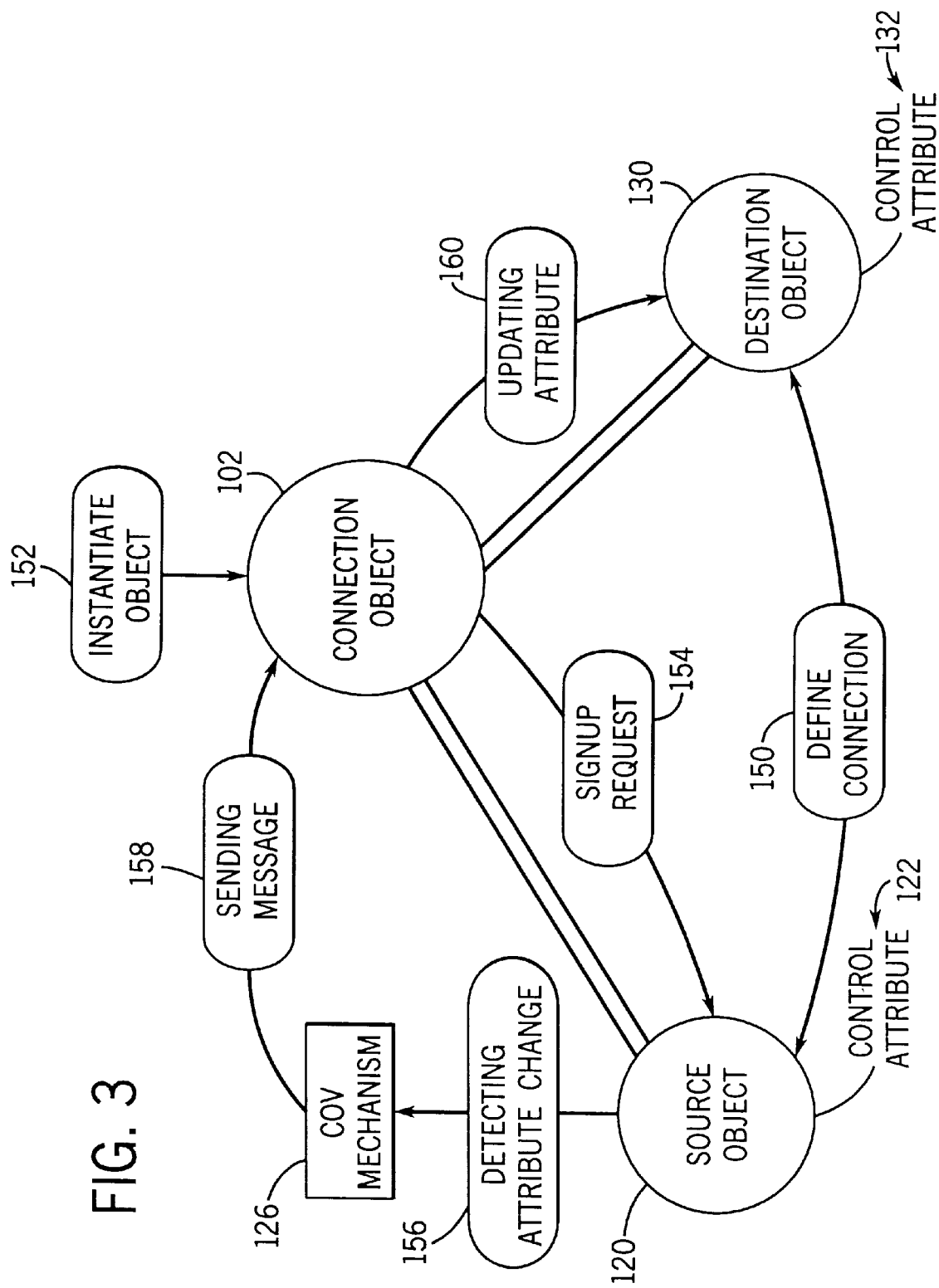
FIG. 3 is a block diagram showing the steps for asychronously communicating between a two standard objects using the connection object of the present invention.

Connection object 102 is implemented as an internal object that is generated automatically at link time by the compiler. Referring to FIGS. 2 and 3, source object 120 has a first control attribute 122 that may be changed in response to a first control method being executed by that source object 120. During development, an application engineer may define a connection (or link via the source code) 150 the first control attribute 122 as an input to a second control attribute 132 associated with destination object 130. For instance, a temperature Analog Input (source) object may serve as an input to a PID (destination) object. Although the existence of a connection object is transparent to the application engineer, this link between attributes establishes a COV connection between the objects.

Up on instantiation 152 of Connection object 102, a signup request 154 is executed by Connection object 102 (using a Read with Signup method) to register a COV request with source object 120. A signup request must contain the source object ID and the attribute IDs which are of interest to the requesting destination object. A change report will occur when any of the attributes which are signed up for change by an amount considered to be "significant" and will be sent to every object which is currently signed up for that attribute. Thus, when first control attribute 122 changes, a COV mechanism 126 associated with source object 120 detects 156 the change and sends a change report message 158 containing the updated value of first control attribute. COV mechanism 126 may be implemented as a Reporting method encapsulated in source object 120. It is also envisioned that rather than a Reporting method, an independent COV mechanism may be incorporated into the operating system that resides on the building automation device. In this case, an operating system call is made when an attribute value changes and a message is transmitted by the operating system to Connection object 102.

In either case, the subscribing Connection object will provide a Handle Report method to receive the report. Connection object 102 uses its mapping data structure to maintain the destination object ID, the destination attribute ID, the source object ID, source attribute ID and their updated value, and in turn generates a message that is sent to destination object 130. Destination object 130 updates 160 second control attribute 132 with the value of first control attribute 122 using a Write Attribute method 116.

Independently from any COV processing that occurs in Connection object 102, destination object 130 will be executing a second control method that will utilize the updated value of second control attribute 132. Unlike the typical message passing situation, source object 120 and destination object 130 communicate asynchronously through Connection object 102.

The definition of what constitutes a "significant" change of an attribute value varies by attribute data type, by how the attribute properties are defined, and by what type of signup is requested (User Interface or Application). For some attribute data types, any change in the value of the attribute is considered a significant change. An example would be a binary attribute. For others, such as analog and integer types that may change frequently and/or by small amounts, the ability to define a filter is required to minimize the amount of message passing. Moreover, in a distributed building automation system, these filters minimize network traffic between interconnected building automation devices.

There are two types of filters that can be defined for most attributes: the first is called Display Precision, used for a user interface purpose, and the second is COV Sensitivity, which is intended for other control applications. A Display Precision property 140 and a COV Sensitivity property 142 are shown in FIG. 2 being associated with first control attribute 122 of source object 120. In all cases, the source object contains the criteria for when a change has occurred. These two filters are described in detail below.

A Display Precision property of an attribute is used for two purposes: (1) to determine the number of decimal places to display in the user interface and (2) to determine a filter value for reporting changes to user interface applications. Display Precision property is an enumeration (e.g., 0=no precision given, 6=tenths, 7=ones and 8=tens) that defines how precise the number will be displayed. For example, the number 3.1418 displayed with Display Precision of 0.001 would be displayed as 3.142. Furthermore, Display Precision serves as a filter which defines when a significant change of the attribute occurs that in turn results in a change report message. Some examples of both the display and filter aspects for various Display Precisions are illustrated as follows:

| Precision | Old Value | Old Display | New Value | New Display | Action |
|---|---|---|---|---|---|
| .01 | .034 | .03 | .031 | .03 | No Report |
| .01 | .034 | .03 | .036 | .04 | Report .036 |
| 1000 | 21,345 | 21,000 | 21,499 | 21,000 | No Report |
| 1000 | 21,345 | 21,000 | 21,512 | 22,000 | Report 21,512 |

The Display Precision property is defined when a standard object is created and is intended for use by user interface applications.

For asynchronous communication between control applications having frequently changing values, attributes of certain data types support an optional filter property called COV Sensitivity. The data type of this property is the same as the attribute value. COV Sensitivity is defined as the amount by which the attribute must change in order to be considered "significant" enough to be reported via a change report message. For example, 0.005 might be selected as the COV Sensitivity for a floating point attribute, such that a significant change would be any change >0.005. The COV Sensitivity property is defined when the object type is created.

Furthermore, the communication architecture provides for consistent reliability handling within the building automation system. A Reliability attribute may be defined for each standard object which indicates whether the object is reliable or unreliable. To further delineate reliability, each attribute of this object may also be defined to have a boolean Assoc. to Reliability property, such that this Assoc. to Reliability property indicates whether the attribute value is suspect when the object itself is unreliable. By using this reliability architecture, the unreliability of one standard object is not propagated throughout the building automation system.

Figure 4:
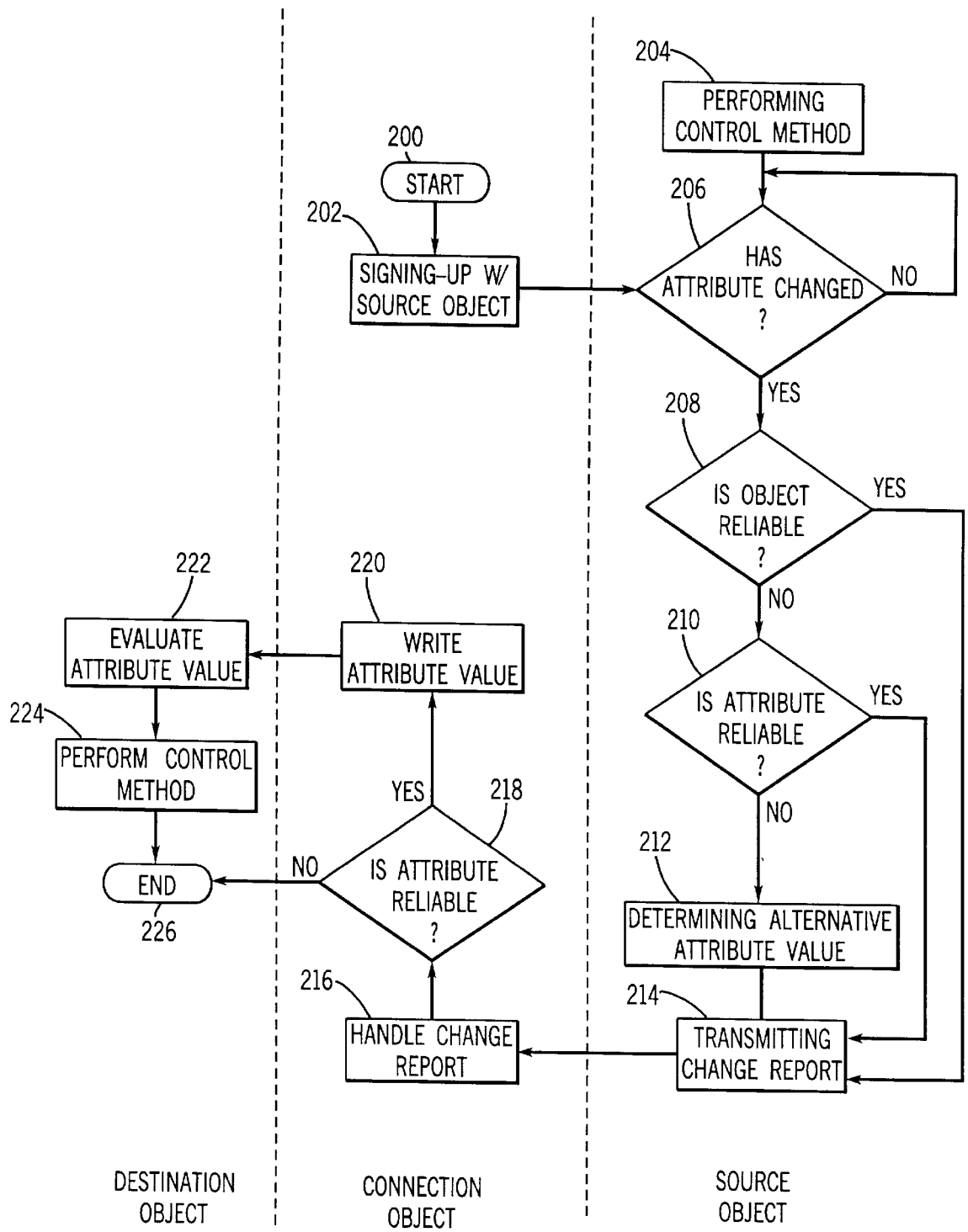
FIG. 4 is a flowchart showing the steps for reliability processing in the context of the asynchronous communication environment of the present invention.

In particular, reliability handling has been incorporated into the above described asynchronous COV processing as shown in the flowchart of FIG. 4. Start block 200 signifies the instantiation of a connection object. In block 202, the connection object immediately signs-up or registers any requested attributes with the source object for COV processing. Block 204 independently performs a control method in the source object that may result in a change in the value of the requested attribute. Decision block 206 represents a COV detection mechanism that monitors the value of the requested attribute.

Upon a significant change in the attribute value, decision block 208 uses a Reliability attribute to determine whether the source object is reliable. An object itself determines the value for its Reliability attribute. For example, if an Analog Input attribute value exceeds its Min_Value or Max_Value property, then the object determines this input to be unreliable and would set its Reliability attribute to an out-of-range value. If source object is reliable, then a change report message containing the requested attribute value is transmitted to a connection object in block 214.

On the other hand, if the source object is unreliable, then decision block 210 evaluates the Assoc to Reliability property for the requested attribute. If the requested attribute is reliable despite the object itself being unreliable, then a change report message containing the requested attribute value is transmitted to connection object in block 214. However, if the requested attribute is suspect as indicated by its Assoc to Reliability property, then the source object itself may determine an alternative (more reliable) attribute value in block 212. To format the change report message with an alternative value, the source object may use a default value, a last reliable value, or compute some other value for the requested attribute value. In block 214, the change report message is sent to the connection object formatted with the source object ID, the requested attribute Id and its value. When the source object is unreliable and the requested attribute has its Assoc to Reliability property set, the value of the Reliability attribute will also be included in the change report message. At the connection object, block 216 uses a handle report method to receive the change report message. In decision block 218, the connection object limits the propagation of unreliability by preventing the writing of unreliable values to a destination object. The connection object will generally not update attribute values from an unreliable source object to a destination object's attribute. However, if the destination object supports reliability handling, then the connection will pass the unreliable value for determination of its use by the destination object. In block 222, the destination object evaluates the reliability of the requested attribute value. For instance, the destination object may itself determine an alternative value, such as a default value, a last reliable value, or compute some other value for the requested attribute value. As will be apparent to one skilled in the art, reliability processing, as discussed in conjunction with block 212 or block 222, may be implemented in either the source object, the destination object, in both of these objects, in neither of these objects or in the connection object. In block 224, an independently executed control method of the destination object uses the updated attribute value. As will apparent to one skilled in the art, the flowchart in FIG. 4 represents one possible use for the reliability data structure that has been implemented into the communication architecture of the present invention.

Additional reliability handling may also be needed when the building automation system is distributed across various building automation devices. An object requesting COV processing relies on the fact that the source object containing the attribute will report a change as it occurs. However, if the source object is located on a remote server building automation device that goes "off-line" with respect to the destination object, the change report message may never occur. In order to maintain a reliable asynchronous communication environment, the requesting building automation device (having the destination object) will periodically poll the server device to determine if it is still there. This poll is called a "heartbeat." If the heartbeat detects a communication failure, then the source object is off-line and unable to deliver reports. In the case of a communication loss, the requesting device will report a change in the Reliability attribute of the source object to any objects on that requesting device that is signed up for reliabili signups to other attributes of the offline object will receive change reports, with the Reliability attribute set to communication loss, regardless of whether those attributes have their Assoc to Reliability property set or not (since loss of communication affects all attributes of the object). The requesting device will continue to poll in attempt to detect restoration of communication with the server device.

This reliability data structure also facilitates monitoring of the building automation system by a system user. A computer-human interface module can access not only the attributes of an object, but also their reliability. If the value of the Reliability attribute indicates the object is currently not in a reliable state, then the user interface can display the state of the Reliability attribute along with the requested attribute value. For example, a temperature attribute may be displayed along with the Reliability attribute as follows:

| | |
|---|---|
| Present Value | 78.54 Deg F. |
| Status | Out of Service |
| Reliability | Unreliable |

Note that even though an object is unreliable, other attributes can still be shown with current or last known values. In addition, since each attribute defines whether it is affected by unreliability of the object (via the Assoc to Reliability property), a user interface module could indicate that individual attribute values are "suspect" when the object is unreliable.

Although the above description discloses reliable asynchronous communication between standard objects, standard objects merely serve as the building blocks for constructing assembly objects and applications that further comprise a building automation system. One skilled in the art will readily recognize from such discussions that the communication architecture of the present invention can also be extended to assembly object and applications.

An assembly consists of a set of attributes, a logic sequence and a collection of standard objects. Thus, an assembly defines a new object type with an attribute set of its own. Its purpose is to create new components that can be used to build the system as if they were pre-defined objects. Analog Input, Binary Output, PID and Schedule are examples of standard objects; whereas a ROOM assembly composed of a temperature Analog Input, a setpoint Analog Output, a door contact Binary output, a lighting Binary Output and a set of Schedule Objects, or a START-STOP assembly consisting of a Binary Input and Binary Output standard object along with some additional logic are examples of assembly objects.

Likewise, an application is a collection of standard objects, assembly objects, and nested applications which are connected together to solve a problem or meet a building automation need. An application also consists of a set of attributes and a logic sequence. Examples of applications might include a VAV Terminal Box, an Air Handling Unit, or a Fan Coil.

Figure 5:
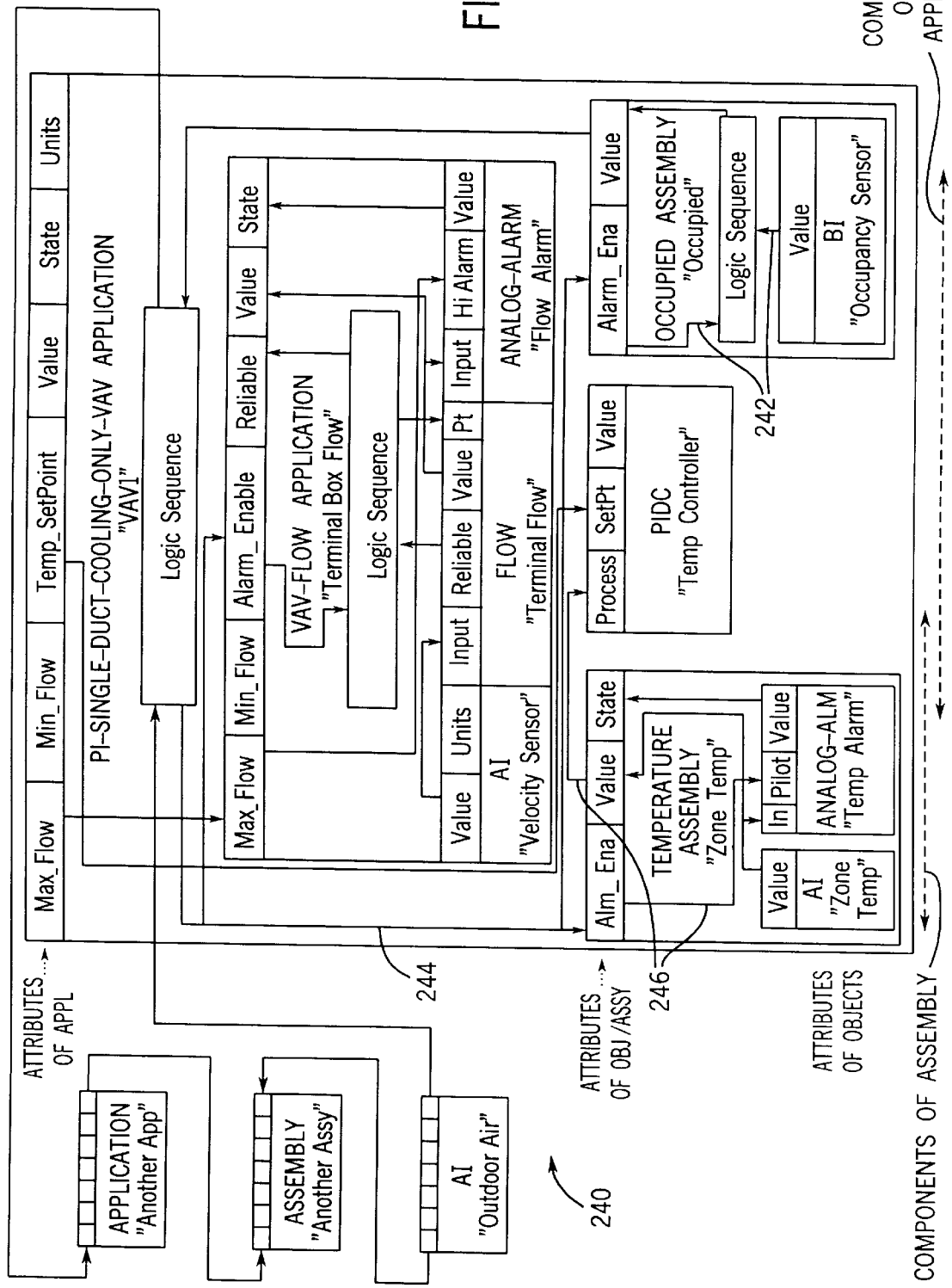
FIG. 5 is a diagram illustrating an exemplary variable air volume (VAV) application constructed from standard software components for use in the building automation system of the invention.

Assembly objects and applications generally support the same type of messages and respond to those messages sent by other objects in much the same manner as standard objects. To illustrate the various types of interconnections, an exemplary variable air volume (VAV) application 240 being constructed from numerous software components (ie. standard objects, assembly objects, or applications) is shown in FIG. 5. This diagram illustrates how these software components are interconnected to construct a building automation application.

For example, the attributes of standard objects in an assembly object may be read/written 242 by an assembly object's logic sequence, however the attributes are not available to objects outside the assembly object unless mapped to an attribute of the assembly by the logic sequence. Similarly, attributes of standard objects in an application may be read/written 244 by an application's logic sequence. Within an assembly object or an application, standard objects can be directly connected 246 to each other by connecting an attribute of one to an attribute of the other, such that communication occurs independent of the logic sequence which may be defined for the assembly object. Through the use of connection objects, execution of these interconnections is done independently from the objects themselves and from the assembly object or application's logic sequence.

Connections are created using the BASIC programming language syntax of the application development tool. In the preferred embodiment, BASIC is a textual programming language from JCI's control group that was designed especially for facility management systems application development. However, conventional BASIC or other types of programming languages could also be used to implement connections as would be apparent to one skilled in the art. Two techniques exist for COV connections: (1) attributes of an assembly object or an application can be connected to attributes of its standard software components, and (2) attributes of a standard software component can be connected to attributes of other standard software components within the assembly object or application.

First, the attributes of an assembly object or an application are used to provide data values for use within the assembly object or application, or for reference by other applications. An assignment statement that defines an attribute can provide an implicit connection to attributes of standard objects. Using BASIC, these connections are defined in the following manner:

```
ATTRIBUTES
    [STATES multistate-set-name ([multistate-string-constant[, . . .])
        .
        .]
    [INPUTS [group-name]
        attribute-name[({property-constant |
            redirected-source-name}[, . . .])]
        .
        .]
    OUTPUTS [group-name]
        attribute-name[((property-constant |
            redirected-source-name)[, . . .])][=source-name[@priority]
        .
        .]
END ATTRIBUTES
```

Where: source-name=the attribute of the OUTPUT connection source Source-name is specified when a connection is required to an OUTPUT attribute of the application from either an attribute of one of the application's components or one of the application's own attributes. Specifying a source-name will cause the source attribute to be written to the connected OUTPUT attribute whenever the source attribute value changes. This is done independent of the execution of the application's logic sequence using a connection object. However, the data type of the source attribute must be compatible with the data type of the OUTPUT attribute.

Second, components within an assembly object or application can share attribute values with other components within the assembly object and application, or between applications. "Components" may include standard objects, assembly objects, (nested) applications, and references to other components outside the application. An assignment statement that defines the components for an assembly object or application can provide an implicit connection to these attributes. Using BASIC, these connections are defined in the following manner:

```
COMPONENTS
    REF component-type:component-name
    Component-type:[ ]]component-name
        [attribute-name={value | source-name[@priority]}]
        .
        .
END COMPONENTS
```

Where: source-name=the attribute of the connection source The source-name is an attribute reference to one of the attributes of a component of the assembly object or application containing this component or an attribute of the assembly object or application itself. This establishes a connection between the two attributes with the source-name as the source attribute. The data types of the two attributes must be compatible.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

We claim:

1. A computer-implemented building automation system for supporting interaction with building automation devices, comprising:

a common object superclass stored in a computer readable memory that defines a plurality of common objects through instantiation such that said common objects have attributes for storing data and have methods for processing stored data;

a source common object for performing a first control method, having a first control attribute that may change based on said first control method and a reporting method for transmitting a message containing the value of said first control attribute in response to a change in the value of said first control attribute;

a destination common object for performing a second control method, having a second control attribute for use by said second control method whose value is connected to said first control attribute; and a connection common object for establishing a connection between said source object and said destination object, having a linking method for registering said second control attribute of said destination object with said source object, and a writing method for providing the value of said first control attribute to said second control attribute of said destination object in response to receiving said message from said source object, wherein said connection object comprises a mapping data structure for storing a source object identifier, a source attribute identifier, a destination object identifier, a destination attribute identifier and an attribute value.

2. The computer-implemented building automation system of claim 1 whereby said connection object executing said writing method is independent from said destination object executing said second control method.

3. The computer-implemented building automation system of claim 1 wherein said first control attribute is further defined as having a change sensitivity property, whereby said reporting method executes when said change in the value of said first control attribute exceeds said change sensitivity property.

4. The computer-implemented building automation system of claim 1 wherein said first control attribute is further defined as having a display precision property, whereby a computer-human interface displays said first control attribute based on said display precision property.

5. The computer-implemented building automation system of claim 1 wherein said source object further comprises a reliability attribute indicative of the dependability of said source object, whereby said reliability attribute being used to prevent propagation of unreliable attribute values in the building automation system.

6. The computer-implemented building automation system of claim 5 wherein said writing method detects an unreliable state for said source object using said reliability attribute, thereby preventing transmission of unreliable attribute values to said destination object.

7. The computer-implemented building automation system of claim 5 wherein said reporting method detects an unreliable state for said source object using said reliability attribute and transmits said message containing a default value for said first control attribute.

8. The computer-implemented building automation system of claim 5 wherein said reporting method detects an unreliable state for said source object using said reliability attribute, and transmits said message containing a last reliable value for said first control attribute.

9. The computer-implemented building automation system of claim 5 wherein said reporting method detects an unreliable state for said source object using said reliability attribute, computes a reliable value for said first control attribute, and transmits said message containing said computed reliable value.

10. The computer-implemented building automation system of claim 5 wherein said message includes the value of said reliability attribute and said writing method providing the value of said reliability attribute to said destination object, whereby said second control method detects an unreliable state for said source object using the value of said reliability attribute and uses a default value of said first control attribute.

11. The computer-implemented building automation system of claim 5 wherein said message includes the value of said reliability attribute and said writing method providing the value of said reliability attribute to said destination object, whereby said second control method detects an unreliable state for said source object using the value of said reliability attribute and uses a last reliable value of said first control attribute.

12. The computer-implemented building automation system of claim 5 wherein said message includes the value of said reliability attribute and said writing method providing the value of said reliability attribute to said destination object, whereby said second control method detects an unreliable state for said source object using the value of said reliability attribute, computes a reliable value of said first control attribute, and uses said computed reliable value.

13. The computer-implemented building automation system of claim 5 further comprises a computer-human interface for displaying said reliability attribute of said source object.

14. The computer-implemented building automation system of claim 5 wherein said first control attribute is further defined as having a reliability property indicative of the reliability of said first control attribute when said reliability attribute indicates an unreliable state for said source object.

15. The computer-implemented building automation system of claim 14 wherein said reporting method transmits a message containing the value of said first control attribute when said reliability property indicates a reliable state for said first control attribute and said reliability attribute indicates an unreliable state for said source object.

16. The computer-implemented building automation system of claim 14 wherein said message includes the value of said reliability property and said writing method provides the value of said reliability property to said destination object, when said reliability property indicates an unreliable state for said first control attribute and said reliability attribute indicates an unreliable state for said source object, whereby said second control method detects an unreliable state of said first control attribute using the value of said reliability property and uses a default value of said first control attribute.

17. The computer-implemented building automation system of claim 14 wherein said message includes the value of said reliability property and said writing method provides the value of said reliability property to said destination object, when said reliability property indicates an unreliable state for said first control attribute and said reliability attribute indicates an unreliable state for said source object, whereby said second control method detects an unreliable state for said first control attribute using the value of said reliability property and uses a last reliable value of said first control attribute.

18. The computer-implemented building automation system of claim 14 wherein said message includes the value of said reliability property and said writing method provides the value of said reliability property to said destination object, when said reliability property indicates an unreliable state for said first control attribute and said reliability attribute indicates an unreliable state for said source object, whereby said second control method detects an unreliable state for said first control attribute using the value of said reliability property, computes a reliable value of said first control attribute, and uses said computed reliable value.

19. An asynchronous communication method for supporting applications in a computer-implemented building automation system, comprising:

defining a plurality of common objects in a computer readable memory through instantiation such that said common objects have attributes for storing data and have methods for processing stored data;

defining a communication connection between a first control attribute of a source common object and a second control attribute of a destination common object;

performing a first control method of said source object, such that a first control attribute being changed based on said first control method;

registering said second control attribute with said source object upon instantiation of a connection common object, such that a communication connection being established between said source object and said destination object, wherein said connection object comprises a mapping data structure for storing a source object identifier, a destination object identifier, an attribute identifier, and an attribute value;

transmitting a message containing the value of said first control attribute from said source object to said connection object, wherein the transmission of said message is based on a change in the value of said first control attribute; and writing the value of said first control attribute to said second control attribute of said destination object by said connection object in response to said message, whereby said destination object performs a second control method using said second control attribute.

20. The asynchronous communication method of claim 19 further comprising a detector for monitoring changes in the value of said first control attribute, wherein said first control attribute is further defined as having a change sensitivity property such that transmitting said message occurs when the change in the value of said first control attribute exceeds said change sensitivity property.

21. The asynchronous communication method of claim 19 wherein said source object further comprises a reliability attribute indicative of the dependability of said source object, whereby said reliability attribute being used to prevent propagation of unreliable attribute values in the building automation system.

22. The asynchronous communication method of claim 21 wherein said connection object detects an unreliable state for said source object using said reliability attribute, thereby preventing transmission of unreliable value for said first control attribute to said destination object.

23. The asynchronous communication method of claim 21 wherein said message includes the value of said reliability attribute and said connection object providing the value of said reliability attribute to said destination object, whereby said second control method detects an unreliable state for said source object using the value of said reliability attribute and uses a default value for said first control attribute.

24. The asynchronous communication method of claim 21 wherein said message includes the value of said reliability attribute and said connection object providing the value of said reliability attribute to said destination object, whereby said second control method detects an unreliable state for said source object using the value of said reliability attribute and uses a last reliable value of said first control attribute.

25. The asynchronous communication method of claim 21 wherein said message includes the value of said reliability attribute and said connection object providing the value of said reliability attribute to said destination object, whereby said second control method detects an unreliable state for said source object using the value of said reliability attribute, computes a reliable value of said first control attribute, and uses said computed reliable value.

26. The asynchronous communication method of claim 21 wherein said first control attribute is further defined as having a reliability property indicative of the reliability of said first control attribute when said reliability attribute indicates an unreliable state for said source object.

27. The asynchronous communication method of claim 21 wherein said message containing the value of said first control attribute is transmitted when said reliability property indicates a reliable state for said first control attribute and said reliability attribute indicates an unreliable state for said source object.

28. A computer-implemented building automation system for supporting interaction with building automation devices, comprising:

a common object superclass stored in a computer readable memory that defines a plurality of common objects through instantiation such that said common objects have attributes for storing data and have methods for processing stored data;

a source common object for performing a first control method, having a first control attribute, a reliability attribute indicative of the dependability of said source object, a reporting method for transmitting a message containing the value of said first control attribute and said reliability attribute; and a destination common object for performing a second control method, having a second control attribute and a writing method for receiving said message and updating said second control attribute with the value of said first control attribute, whereby said reliability attribute being used by said destination object to prevent propagation of unreliable attribute values in the building automation system.

\* \* \* \* \*